US011701735B2

(12) United States Patent
Chen et al.

(10) Patent No.: US 11,701,735 B2
(45) Date of Patent: Jul. 18, 2023

(54) ELECTROMAGNETIC PULSE ADDITIVE DEVICE AND METHOD FOR CONNECTION RING OF HEAVY-LIFT CARRIER ROCKET

(71) Applicant: Nanchang Hangkong University, Nanchang (CN)

(72) Inventors: Yuhua Chen, Nanchang (CN); Jinyang Hu, Nanchang (CN); Timing Zhang, Nanchang (CN); Jilin Xie, Nanchang (CN); Limeng Yin, Nanchang (CN); Shanlin Wang, Nanchang (CN); Yongde Huang, Nanchang (CN); Mingwei Wei, Nanchang (CN); Wentao Zhang, Nanchang (CN)

(73) Assignee: NANCHANG HANGKONG UNIVERSITY, Nanchang (CN)

( * ) Notice: Subject to any disclaimer, the term of this patent is extended or adjusted under 35 U.S.C. 154(b) by 0 days.

(21) Appl. No.: 17/568,393

(22) Filed: Jan. 4, 2022

(65) Prior Publication Data
US 2022/0402066 A1    Dec. 22, 2022

(30) Foreign Application Priority Data

Jun. 22, 2021 (CN) .......................... 202110691514.6

(51) Int. Cl.
| | |
|---|---|
| *H05B 6/10* | (2006.01) |
| *H05B 6/62* | (2006.01) |
| *B23K 13/02* | (2006.01) |
| *B64G 1/64* | (2006.01) |
| *B23K 101/00* | (2006.01) |

(52) U.S. Cl.
CPC .............. *B23K 13/02* (2013.01); *B64G 1/641* (2013.01); *B23K 2101/006* (2018.08)

(58) Field of Classification Search
CPC .. B23K 13/02; B23K 2101/006; B64G 1/641; Y02P 10/25
USPC ....... 219/617, 603, 611, 612, 615, 616, 630, 219/635, 659
See application file for complete search history.

(56) References Cited

U.S. PATENT DOCUMENTS

| | | | | | |
|---|---|---|---|---|---|
| 3,007,022 | A | * | 10/1961 | Hunt ...................... | B23K 13/06 219/617 |
| 2011/0281070 | A1 | * | 11/2011 | Mittal .................... | H05K 1/097 428/221 |

* cited by examiner

Primary Examiner — Quang T Van
(74) Attorney, Agent, or Firm — Mark C. Johnson; Johnson Dalal

(57) ABSTRACT

An electromagnetic pulse additive device for a connection ring of a heavy-lift carrier rocket is provided. The device includes brackets, a gear disk rotatably matched with the annular ground rail through a plurality of rolls arranged in a circumferential direction of the gear disk, a first drive motor, an annular ground rail, and a guide rail in a semicircular shape arranged at top ends of the brackets. An output shaft of a first drive motor is fixedly provided with a first drive gear engaged with the gear disk. The guide rail is slidably provided with three lifting modules which respectively drive a bending module, an electromagnetic head arranged electromagnetic coil electrically connected with a capacitor and a discharge circuit, and a rotational friction and extrusion module including a second drive motor and a friction bar fixedly connected to an output shaft of the second drive motor to rise and fall.

8 Claims, 4 Drawing Sheets

ELECTROMAGNETIC PULSE ADDITIVE DEVICE AND METHOD FOR CONNECTION RING OF HEAVY-LIFT CARRIER ROCKET

CROSS REFERENCE TO RELATED APPLICATION

This patent application claims the benefit and priority of Chinese Patent Application No. 202110691514.6 filed on Jun. 22, 2021 the disclosure of which is incorporated by reference herein in its entirety as part of the present application.

TECHNICAL FIELD

The present disclosure relates to the field of additive manufacturing technologies, and particularly relates to an electromagnetic pulse additive device and method for a connection ring of a heavy-lift carrier rocket.

BACKGROUND ART

With the continuous development of the aerospace industry in China, there is a higher demand for large-scale and integrated manufacturing of carrier rockets, space stations, etc., such as a connection ring of a 10-meter high-strength aluminum alloy heavy-lift carrier rocket. So, it is difficult to manufacture the same by using a traditional manufacturing process. An electric arc fuse three-dimensional (3D) printing technology requires layer-by-layer cladding, so manufacturing defects such as pores and composition segregation are easily emerged, which directly affects the mechanical properties of additive components. An electromagnetic pulse additive technology, as a novel, environmentally friendly, and highly efficient solid-phase connection technology, has a great application prospect in the aerospace and automobile industries.

The patent application No. ZL201780007332.4 discloses a forming method using impact welding in an additive manufacturing process. The method includes: providing a wire rod with a powder-filled metal core located in a sheath, then plugging the wire rod into a guide pipe with an opening, and providing an energy pulse (electromagnetic pulse or laser pulse) to interact with the sheath to pinch off one section of the wire rod. The energy pulse advances the one section toward a base at a sufficient speed, and the powder-filled metal core is welded to the base. In order to eliminate manufacturing defects such as the pores and composition segregation that are easily caused in the cladding process, the method for pinching off the wire rod is used to conduct the additive operation, thereby improving the performance of an additive part. However, the efficiency of this additive method is low.

SUMMARY

The present disclosure aims to provide an electromagnetic pulse additive device and method for a connection ring of a heavy-lift carrier rocket, so as to solve the problems in the existing art and improve the compactness of a structure of an additive part of the connection ring of the heavy-lift carrier rocket.

In order to achieve the above-mentioned purpose, the present disclosure provides the following solution.

The present disclosure provides an electromagnetic pulse additive device for a connection ring of a heavy-lift carrier rocket, which includes brackets, a gear disk, a first drive motor, an annular ground rail, and a guide rail in a semi-circular shape arranged at top ends of the brackets. The gear disk is rotatably matched with the annular ground rail through multiple rolls arranged in a circumferential direction of the gear disk; a top surface of the gear disk is configured to place an annular additive base body; an output shaft of the first drive motor is fixedly provided with a first drive gear engaged with the gear disk; the guide rail is slidably provided with three lifting modules; a first one of the lifting modules is capable of driving a bending module to rise and fall; a second one of the lifting modules is capable of driving an electromagnetic head to rise and fall; and a third one of the lifting modules is capable of driving a rotational friction and extrusion module to rise and fall.

An electromagnetic coil is arranged in the electromagnetic head and is electrically connected with a capacitor and a discharge circuit.

The rotational friction and extrusion module includes a second drive motor and a friction bar fixedly connected to an output shaft of the second drive motor.

The bending module includes a supporting framework and a supporting plate fixedly arranged on a bottom portion of the supporting framework. The supporting plate is provided with a material guide chute and drive wheels capable of driving an additive thin sheet in the material guide chute to slide with respect to the material guide chute. The supporting plate is further provided with a wedge block, a top block, and a top wheel. The wedge block, the top block, and the top wheel are close to a material outlet end of the material guide chute. A slope of the wedge block and the top block are in close contact with one side of the additive thin sheet; and an other side of the additive thin sheet is in sliding fit with the top wheel.

In some embodiments, the supporting framework may be further fixedly provided with a grinding machine. The grinding machine may be configured to grind surfaces to be bonded; and the surfaces to be bonded may include a surface of a additive base body and a surface of the additive thin sheet.

In some embodiments, each lifting module of the three lifting module may include a sliding framework which is in sliding fit with the guide rail through multiple sliding blocks. An arc-shaped rack may be fixedly arranged on an outer side surface of the guide rail. The sliding framework may be fixedly provided with a guide rail motor. A second drive gear engaged with the arc-shaped rack may be fixedly arranged on an output shaft of the guide rail motor. The sliding framework may be fixedly provided with a nut which is threadedly connected with a screw rod. A screw-rod motor may be capable of driving the screw rod to rotate. The screw rod motor may be fixedly arranged on a mounting plate; the mounting plate may be connected with multiple guide pillars which are in sliding fit with the sliding framework. An axial direction of each of the guide pillars may be parallel to an axial direction of the screw rod. Ends of the guide pillars which may be away from the mounting plate may be fixed with a lifting plate; and the mounting plate and the lifting plate may be rotatably fitted with the screw rod respectively.

In some embodiments, the second drive motor may be fixedly arranged on a connection plate, and the connection plate may be fixedly connected with a corresponding lifting plate of the three lifting modules.

In some embodiments, the supporting framework may be fixedly connected with a corresponding lifting plate of the three lifting modules.

In some embodiments, the drive wheels include four drive wheels, which may be fixedly connected with respective driven shafts; the supporting framework and the supporting plate are rotatably fitted with the driven shafts. Each of the driven shafts is provided with one driven gear. The supporting framework may be further rotatably provided with a driving shaft. The driving shaft may be provided with a driving gear. The four driven gears may be engaged with the driving gear; and the supporting framework may be further fixedly provided with a third drive motor capable of driving the driving shaft to rotate.

In some embodiments, an output shaft of the third drive motor may be fixedly provided with a driving belt pulley. The driving shaft may be fixedly provided with a driven belt pulley; and a belt may wound on the driving belt pulley and the driven belt pulley.

In some embodiments, the supporting plate may be further fixedly provided with multiple feed guide wheels close to a feed end of the material guide chute. The plurality of feed guide wheels may be arranged into two rows of feed guide wheels. The additive thin sheet may be located between the two rows of feed guide wheels; and the feed guide wheels may be in sliding fit with the additive thin sheet.

The present disclosure further provides an electromagnetic pulse additive method for a connection ring of a heavy-lift carrier rocket. The method is carried out by the above-mentioned electromagnetic pulse additive device for the connection ring of the heavy-lift carrier rocket, the method includes the following steps:

(1) bending the additive thin sheet by using the bending module according to a curvature of the connection ring, so as to form a curved additive thin sheet;

(2) driving the gear disk to rotate around the annular ground rail by the first driving motor, driving the additive base body to rotate by the gear disk, and adding the curved additive thin sheet to the additive base body by the electromagnetic pulse generated by the electromagnetic coil in the electromagnetic head, so as to form an additive ring part; and (3) applying rotational friction and extrusion action to the additive ring part by means of the rotational friction and extrusion module, so as to eliminate defects on an additive interface.

Compared with the existing art, the following beneficial technical effects are achieved in the present embodiments.

According to the electromagnetic pulse additive device and the method for the connection ring of the heavy-lift carrier rocket, the compactness of a structure of an additive part of the connection ring of the heavy-lift carrier rocket can be improved.

BRIEF DESCRIPTION OF THE DRAWINGS

In order to describe embodiments of the present disclosure or technical solutions in the existing art more clearly, drawings required to be used in the embodiments will be briefly introduced below. It is apparent that the drawings in the descriptions below are only some embodiments of the present disclosure. Those of ordinary skill in the art also can obtain other drawings according to these drawings without making creative work.

Figure 1:
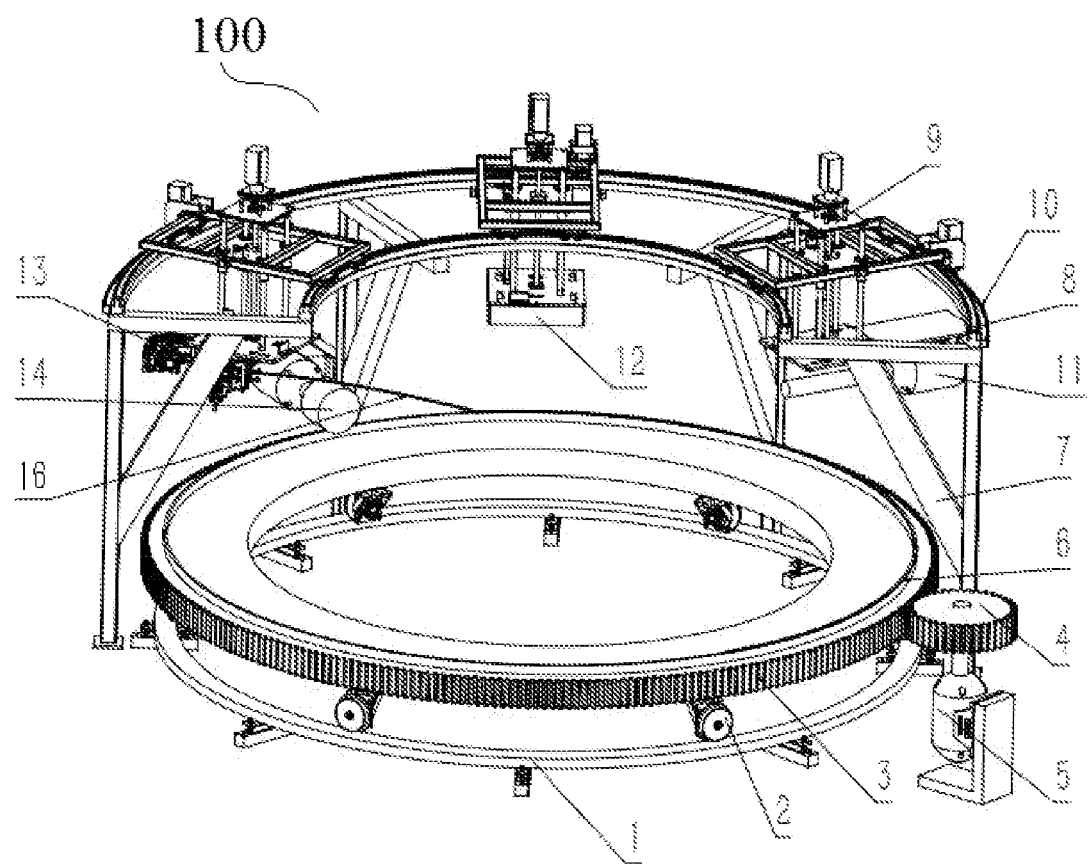
FIG. 1 is a schematic structural diagram of an electromagnetic pulse additive device for a connection ring of a heavy-lift carrier rocket according to an embodiment of the present disclosure.
Figure 2:
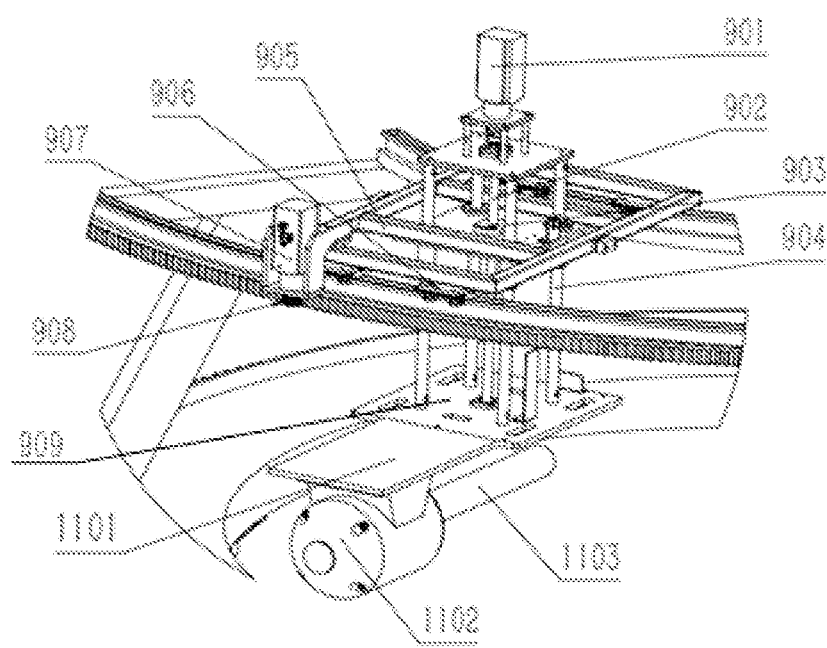
FIG. 2 is a first partially schematic structural diagram of the electromagnetic pulse additive device for the connection ring of the heavy-lift carrier rocket according to an embodiment of the present disclosure.
Figure 3:
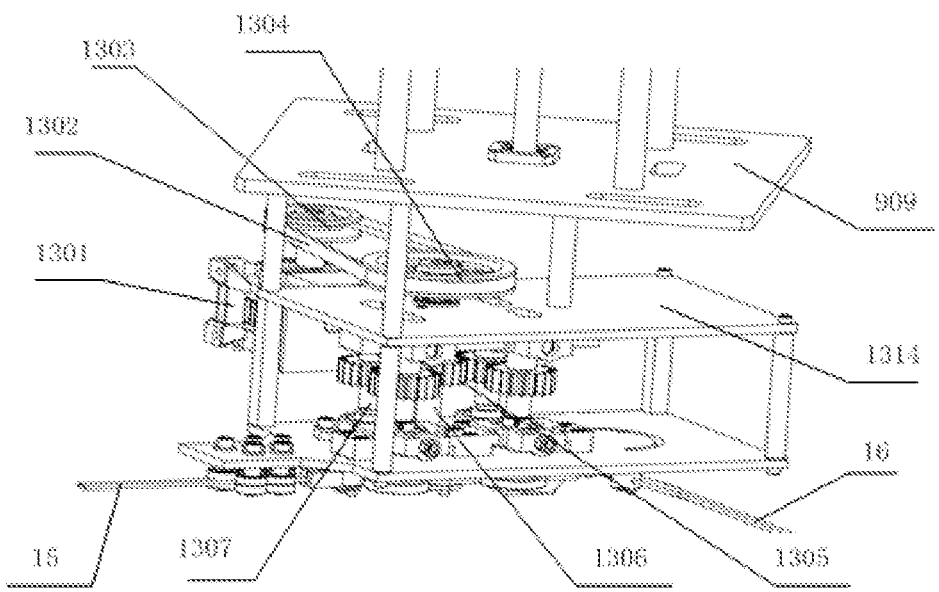
FIG. 3 is a second partially schematic structural diagram of the electromagnetic pulse additive device for the connection ring of the heavy-lift carrier rocket according to an embodiment of the present disclosure.
Figure 4:
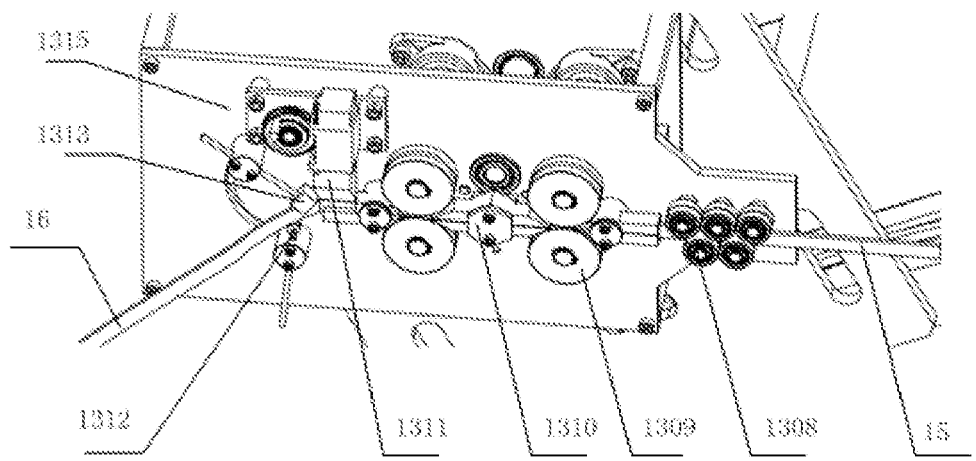
FIG. 4 is a third partially schematic structural diagram of the electromagnetic pulse additive device for the connection ring of the heavy-lift carrier rocket according to an embodiment of the present disclosure.
Figure 5:
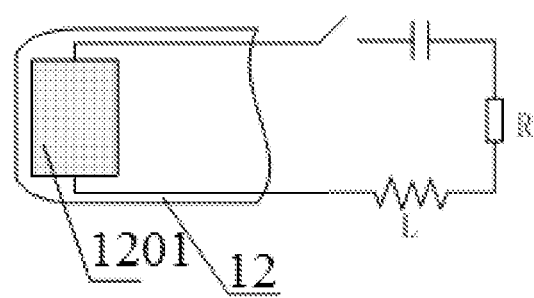
FIG. 5 is a fourth partially schematic structural diagram of the electromagnetic pulse additive device for the connection ring of the heavy-lift carrier rocket according to an embodiment of the present disclosure.

List of the reference characters: 100 electromagnetic pulse additive device for a connection ring of a heavy-lift carrier rocket; 1 annular ground rail; 2 roll; 3 gear disk; 4 first drive gear; 5 first drive motor; 6 additive base body; 7 bracket; 8 guide rail; 9 lifting module; 10 arc-shaped rack; 11 rotational friction and extrusion module; 12 electromagnetic head; 1201 electromagnetic coil; 13 bending module; 14 grinding machine; 15 additive thin sheet; 16 curved additive thin sheet; 901 screw rod motor; 902 screw rod; 903 nut; 904 guide pillar; 905 sliding framework; 906 sliding block; 907 guide rail motor; 908 second drive gear; 909 lifting plate; 1101 connection plate; 1102 second drive motor; 1103 friction bar; 1301 third drive motor; 1302 belt; 1303 driving belt pulley; 1304 driven belt pulley; 1305 driving gear; 1306 driving shaft; 1307 driven shaft; 1308 feed guide wheel; 1309 drive wheel; 1310 material guide chute; 1311 wedge block; 1312 top wheel; 1313 top block; 1314 supporting framework; and 1315 supporting plate.

DETAILED DESCRIPTION OF THE EMBODIMENTS

The following clearly and completely describes the technical solution in the embodiments of the present disclosure in combination with the accompanying drawings of the embodiments of the present disclosure. Apparently, the described embodiments are only a part of the embodiments of the present disclosure, not all of the embodiments. Based on the embodiments in the present disclosure, all other embodiments obtained by those of ordinary skill in the art without creative efforts shall fall within the protection scope of the present disclosure.

The present disclosure aims to provide an electromagnetic pulse additive device and method for a connection ring of a heavy-lift carrier rocket, so as to solve the problems in the existing art and improve the compactness of a structure of an additive part of the connection ring of the heavy-lift carrier rocket.

In order to make the above-mentioned purposes, characteristics and advantages of the present invention more obvious and understandable, the present invention is further described in detail below with reference to the accompanying drawings and specific implementation modes.

As shown in FIG. 1 to FIG. 5, the present embodiment provides an electromagnetic pulse additive device 100 for a connection ring of heavy-lift carrier rocket, which includes brackets 7, a gear disk 3, a first drive motor 5, an annular ground rail 1, and a guide rail 8 in a semicircular shape arranged at top ends of the brackets 7. The gear disk 3 is rotatably matched with the annular ground rail 1 through a plurality of rolls 2 arranged in a circumferential direction of the gear disk. A top surface of the gear disk 3 is configured to place an annular additive base body 6; and an output shaft of the first drive motor 5 is fixedly provided with a first drive gear 4 engaged with the gear disk 3.

The guide rail 8 is slidably provided with three lifting modules 9; a first one of the lifting modules 9 can drive a bending module 13 to rise and fall; a second one of the lifting modules 9 can drive an electromagnetic head 12 to rise and fall; and a third one of the lifting modules 9 can drive a rotational friction and extrusion module 11 to rise and fall. Each lifting module 9 of the three lifting module includes a sliding framework 905 which is in sliding fit with the guide rail 8 through a plurality of sliding blocks 906. An arc-shaped rack 10 is fixedly arranged on an outer side surface of the guide rail 8. The sliding framework 905 is fixedly provided with a guide rail motor 907. A second drive gear 908 engaged with the arc-shaped rack 10 is fixedly arranged on an output shaft of the guide rail motor 907. The sliding framework 905 is fixedly provided with a nut 903 that is threadedly connected with a screw rod 902. A screw-rod motor 901 can drive the screw rod 902 to rotate. The screw rod motor 901 is fixedly arranged on a mounting plate. The mounting plate is connected with a plurality of guide pillars 904 which are in sliding fit with the sliding framework 905. An axial direction of each of the guide pillars 904 is parallel to an axial direction of the screw rod 902. Ends of the guide pillars 904 which are away from the mounting plate are fixed with a lifting plate 909; and the mounting plate and the lifting plate 909 are rotatably fitted with the screw rod 902. The lifting module is controlled by the guide rail motor 907 to move on the guide rail 8 and is driven by the screw rod motor 901 to move up and down.

An electromagnetic coil 1201 is arranged in an electromagnetic head 12. The electromagnetic coil 1201 is electrically connected with a capacitor and a discharge circuit. The electromagnetic head 12 is fixedly connected with a corresponding lifting plate 909 of the three lifting modules. The electromagnetic coil 1201 should further be connected with a power supply, a high-voltage switch, and the like. An electromagnetic pulse forming principle is as follows. Energy is stored in the capacitor; the discharge switch is closed instantly; the capacitor, the electromagnetic coil, and the discharge circuit form an RLC oscillating circuit including a resistance, a inductance and a capacitance; and a transient high alternating current will flow in RLC oscillating circuit through a working coil, which generates a strong alternating magnetic field. According to the faraday law of electromagnetic induction and the skin effect, the magnetic field will generate induction current opposite to current of the working coil on a surface of a metal, and the induction current will also generate an induction magnetic field to prevent the alternating magnetic field of the working coil from penetrating through an additive thin sheet 15. Time-varying and mutually exclusive magnetic field forces are generated between the electromagnetic coil 1201 and the additive thin sheet 15. The additive thin sheet 15 deforms at a high speed under the action of the magnetic field forces. After the high-voltage switch is closed, the energy stored in the capacitor is instantly released, and strong pulse current will pass through the electromagnetic coil 1201. Due to the electromagnetic induction, a vortex is formed on the surface of the additive thin sheet 15.

Under the action of the magnetic field force, the additive thin sheet 15 collides with the additive base body 6 at a high speed, and a collision force can reach the GPa level, so that the additive thin sheet 15 is in close contact with surface atoms of the additive base body 6 to achieve metallurgical bond. When the electromagnetic pulse achieves the metallurgical bond between the additive thin sheet 15 and the additive base body 6, due to the high speed, it is inevitable that there will be a partial unfused area at a bonding interface. Therefore, partial plasticizing deformation is generated by means of the rotational friction and extrusion to eliminate the unfused area.

The rotational friction and extrusion module 11 includes a second drive motor 1102 and a friction bar 1103 fixedly connected to an output shaft of the second drive motor 1102. The second drive motor 1102 is fixedly arranged on a connection plate 1101. The connection plate 1101 is fixedly connected with the corresponding lifting plate 909 of the three lifting modules.

The bending module 13 includes a supporting framework 1314 and a supporting plate 1315 fixedly arranged on a bottom portion of the supporting framework 1314. The supporting plate 1315 is provided with a material guide chute 1310 and drive wheels 1309 capable of driving the additive thin sheet 15 in the material guide chute 1310 to slide with respect to the material guide chute 1310. The supporting plate 1315 is further provided with a wedge block 1311, a top block 1313, and a top wheel 1312; the wedge block 1311, the top block 1313, and the top wheel 1312 are close to a material outlet end of the material guide chute 1310. A slope of the wedge block 1311 and the top block 1313 are in close contact with one side of the additive thin sheet 15; and an other side of the additive thin sheet 15 is in sliding fit with the top wheel 1312. The supporting framework 1314 is further fixedly provided with a grinding machine 14. The grinding machine 14 is configured to grind surfaces to be bonded; and the surfaces to be bonded include a surface of the additive base body 6 and a surface of the additive thin sheet 15. The supporting framework 1314 is fixedly connected with the corresponding lifting plate 909 of the three lifting modules.

The drive wheels includes four drive wheels 1309, which are fixedly connected with respective driven shafts 1307. The supporting framework 1314 and the supporting plate 1315 are rotatably fitted with the driven shafts 1307. Each of the driven shafts 1307 is provided with one driven gear; the supporting framework 1314 is further rotatably provided with a driving shaft 1306; the driving shaft 1306 is provided with a driving gear 1305. The driven gear is engaged with the driving gear 1305; and the supporting framework 1314 is further fixedly provided with a third drive motor 1301 capable of driving the driving shaft 1306 to rotate.

An output shaft of the third drive motor 1301 is fixedly provided with a driving belt pulley 1303; the driving shaft 1306 is fixedly provided with a driven belt pulley 1304; and a belt 1302 is wound on the driving belt pulley 1303 and the driven belt pulley 1304. The supporting plate 1315 is further fixedly provided with a plurality of feed guide wheels 1308 close to a feed end of the material guide chute 1310. The plurality of feed guide wheels 1308 are arranged into two rows of feed guide wheels. The additive thin sheet 15 is located between the two rows of feed guide wheels 1308; and the feed guide wheels 1308 are in sliding fit with the additive thin sheet 15. The third drive motor 1301 drives the driving shaft 1306 to rotate through the belt 1302, and the driving shaft 1306 drives the driven shaft 1307 to rotate through a gear transmission. The driven shaft 1307 is fixedly connected with the drive wheel 1309. The drive wheel 1309 rotates to drive the additive thin sheet 15 to be fed along the material guide chute 1310. The wedge block 1311, the top wheel 1312, and the top block 1313 cooperatively controls a bending curvature of the additive thin sheet 15.

Figure 6:
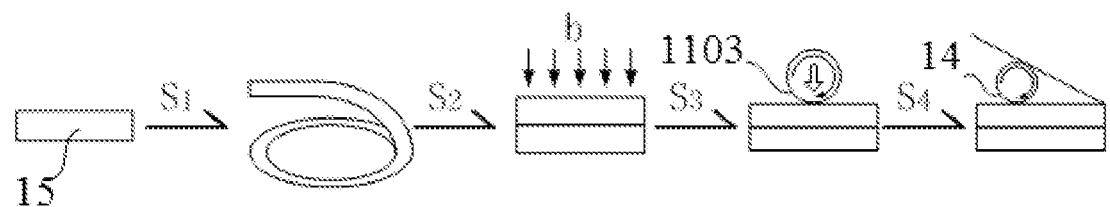
FIG. 6 is a flow diagram of an electromagnetic pulse additive method for the connection ring of the heavy-lift carrier rocket according to an embodiment of the present disclosure.

As shown in FIG. 6, the embodiment further provides an electromagnetic pulse additive method for a connection ring the of heavy-lift carrier rocket. The method is carried out by the above-mentioned electromagnetic pulse additive device 100 for the connection ring of the heavy-lift carrier rocket, the method includes the following steps:

In step (1), the additive thin sheet 15 is bent according to a curvature of the connection ring by using the bending module 13, so as to form a curved additive thin sheet 16;

In step (2), the first driving motor 5 drives the gear disk 3 to rotate around the annular ground rail 1; the gear disk 3 drives the additive base body 6 to rotate; and the curved additive thin sheet 16 is added by the electromagnetic coil 1201 in the electromagnetic head 12 to the additive base body 6 in a manner of electromagnetic pulse, so as to form an additive ring part;

In step (3), the rotational friction and extrusion module 11 applies rotational friction and extrusion action to the additive ring part, so as to eliminate defects such as pores and cracks on an additive interface;

In step (4), the grinding machine 14 grinds the top surface of the additive thin sheet 15 added to the additive base body 6 in the step (2), so as to clean the connection surface and facilitate subsequent additive operation.

In the description of the present invention, it should be noted that orientations or positional relationships indicated by the terms "center", "top", "bottom", "left", "right", "vertical", "horizontal", "inside", "outside", and the like are orientations or positional relationships as shown in the drawings, and are only for the purpose of facilitating and simplifying the description of the present invention instead of indicating or implying that devices or elements indicated must have particular orientations, and be constructed and operated in the particular orientations, so these terms are not construed as limiting the present invention. In addition, the terms "first" and "second" are only for the purpose of description, and may not be understood as indicating or implying the relative importance.

The principle and implementation modes of the present disclosure are described by applying specific examples in the present specification. The descriptions of the above embodiments are only intended to help to understand the method of the present disclosure and a core idea of the method. In addition, those ordinarily skilled in the art can make changes to the specific implementation modes and the application scope according to the idea of the present disclosure. From the above, the contents of the specification shall not be deemed as limitations to the present disclosure.

What is claimed is:

1. An electromagnetic pulse additive device for a connection ring of a heavy-lift carrier rocket, the device comprising brackets, a gear disk, a first drive motor, an annular ground rail, and a guide rail in a semicircular shape arranged at top ends of the brackets, wherein the gear disk is rotatably matched with the annular ground rail through a plurality of rolls arranged in a circumferential direction of the gear disk; a top surface of the gear disk is configured to place an annular additive base body; an output shaft of the first drive motor is fixedly provided with a first drive gear engaged with the gear disk; the guide rail is slidably provided with three lifting modules; a first one of the lifting modules is capable of driving a bending module to rise and fall; a second one of the lifting modules is capable of driving an electromagnetic head to rise and fall; a third one of the lifting modules is capable of driving a rotational friction and extrusion module to rise and fall;

an electromagnetic coil is arranged in the electromagnetic head and is electrically connected with a capacitor and a discharge circuit;

the rotational friction and extrusion module comprises a second drive motor and a friction bar fixedly connected to an output shaft of the second drive motor;

the bending module comprises a supporting framework and a supporting plate fixedly arranged on a bottom portion of the supporting framework; the supporting plate is provided with a material guide chute and drive wheels capable of driving an additive thin sheet in the material guide chute to slide with respect to the material guide chute; the supporting plate is further provided with a wedge block, a top block, and a top wheel; the wedge block, the top block, and the top wheel are close to a material outlet end of the material guide chute; a slope of the wedge block and the top block are in close contact with one side of the additive thin sheet; and an other side of the additive thin sheet is in sliding fit with the top wheel.

2. The electromagnetic pulse additive device for the connection ring of the heavy-lift carrier rocket according to claim 1, wherein the supporting framework is further fixedly provided with a grinding machine; the grinding machine is configured to grind surfaces to be bonded; and the surfaces to be bonded comprise a surface of the additive base body and a surface of the additive thin sheet.

3. The electromagnetic pulse additive device for the connection ring of the heavy-lift carrier rocket according to claim 1, wherein each lifting module of the three lifting module comprises a sliding framework which is in sliding fit with the guide rail through a plurality of sliding blocks; an arc-shaped rack is fixedly arranged on an outer side surface of the guide rail; the sliding framework is fixedly provided with a guide rail motor; a second drive gear engaged with the arc-shaped rack is fixedly arranged on an output shaft of the guide rail motor; the sliding framework is fixedly provided with a nut which is threadedly connected with a screw rod; a screw-rod motor is capable of driving the screw rod to rotate; the screw rod motor is fixedly arranged on a mounting plate; the mounting plate is connected with a plurality of guide pillars which are in sliding fit with the sliding framework; an axial direction of each of the guide pillars is parallel to an axial direction of the screw rod; ends of the guide pillars which are away from the mounting plate are fixed with a lifting plate; and the mounting plate and the lifting plate are rotatably fitted with the screw rod.

4. The electromagnetic pulse additive device for the connection ring of the heavy-lift carrier rocket according to claim 3, wherein the second drive motor is fixedly arranged on a connection plate, and the connection plate is fixedly connected with a corresponding lifting plate of the three lifting modules.

5. The electromagnetic pulse additive device for the connection ring of the heavy-lift carrier rocket according to claim 3, wherein the supporting framework is fixedly connected with a corresponding lifting plate of the three lifting modules.

6. The electromagnetic pulse additive device for the connection ring of the heavy-lift carrier rocket according to claim 1, wherein the drive wheels comprise four drive wheels which are fixedly connected with respective driven shafts; the supporting framework and the supporting plate are rotatably fitted with the driven shafts; each of the driven shafts is provided with one driven gear; the supporting framework is further rotatably provided with a driving shaft; the driving shaft is provided with a driving gear; the driven gear is engaged with the driving gear; and the supporting framework is further fixedly provided with a third drive motor capable of driving the driving shaft to rotate.

7. The electromagnetic pulse additive device for the connection ring of the heavy-lift carrier rocket according to claim 6, wherein an output shaft of the third drive motor is fixedly provided with a driving belt pulley; the driving shaft is fixedly provided with a driven belt pulley; and a belt is wound on the driving belt pulley and the driven belt pulley.

8. The electromagnetic pulse additive device for the connection ring of the heavy-lift carrier rocket according to claim 1, wherein the supporting plate is further fixedly provided with a plurality of feed guide wheels close to a feed end of the material guide chute; the plurality of feed guide wheels are arranged into two rows of feed guide wheels; the additive thin sheet is located between the two rows of feed guide wheels; and the feed guide wheels are in sliding fit with the additive thin sheet.

* * * * *